United States Patent [19]

Scibelli et al.

[11] 3,982,039

[45] Sept. 21, 1976

[54] USE OF MODIFIED WHEY SOLIDS AS MARGARINE ADDITIVE AND PRODUCT THEREOF

[75] Inventors: Gabriele E. Scibelli, New Rochelle, N.Y.; Joseph Vincent Feminella, Trumbull, Conn.

[73] Assignee: Stauffer Chemical Company, Westport, Conn.

[22] Filed: Jan. 16, 1975

[21] Appl. No.: 541,559

[52] U.S. Cl.................................. 426/603; 426/583
[51] Int. Cl.².............................................. A23D 3/02
[58] Field of Search..................... 426/189, 339, 603

[56] References Cited
UNITED STATES PATENTS

| | | | |
|---|---|---|---|
| 3,840,996 | 10/1974 | Grindstoff et al............... | 260/112 X |
| R27,806 | 10/1973 | Dienst et al..................... | 260/112 R |

OTHER PUBLICATIONS

"Margarine", Andersen et al. 2nd Ed. 1965, Pergamon Press: New York, pp. 81, 82, 118, 119, 120.

*Primary Examiner*—Joseph M. Golian
*Attorney, Agent, or Firm*—Richard P. Fennelly

[57] ABSTRACT

Use of a particular modified whey solids product in margarine as a substitute for non-fat dry milk solids gives a product having a smooth texture and low degree of syneresis or liquid separation on standing.

8 Claims, No Drawings

USE OF MODIFIED WHEY SOLIDS AS MARGARINE ADDITIVE AND PRODUCT THEREOF

TECHNICAL DESCRIPTION OF THE INVENTION

Margarine is a well-known type of product, e.g., see U.S. Pat. No. 2,955,039, and Kirk-Othmer Encyclopedia of Chemical Technology, 2nd Ed., Vol. 13, pp. 56-65 (1967), which according to Government regulations, e.g., 21 C.F.R. 45.1, is produced by combining an aqueous phase with not less than about 80%, by weight, e.g. 80–90%, of vegetable or rendered animal fat. The aqueous phase ingredients, which constitute about 10-20%, by weight, of the margarine, may comprise: water and/or milk and/or milk products; edible protein, e.g. whey or modified whey products; and mixtures of the foregoing. Vitamin A is used in an amount such that the final margarine contains not less than 15,000 international units per pound. Optional ingredients comprise Vitamin D, salt, sweeteners, emulsifiers, preservatives, color additives, flavoring substances, acidulants and alkalizers.

Non-fat dry milk solids are used as binders in conventional margarine formulations usually at about 1% to about 5% by weight. Although it has been recognized that certain whey products could be used as a partial replacement for non-fat dry milk solids, it has not been recognized that the particular type of whey product used herein could be used as a replacement for the non-fat dry milk solids contained in the margarine to give a final product having a smooth texture and a low degree of syneresis or liquid separation on standing.

The modified dried whey solids product used herein is derived by drying the low protein-high ash fraction or second fraction obtained by passing partially delactosed cheese whey mother liquor through a bed of molecular sieve resin as described in U.S. Reissue Pat. No. 27,806, U.S. Pat. No. 3,840,996 and U.S. Ser. No. 336,844, filed Feb. 28, 1973 now abandoned. The whey fraction has a general composition, by weight, of: lactose, about 40 to about 50%; ash, about 20 to about 30%; protein (N × 6.38), about 15 to about 20%; lactate, about 7 to about 11%; citrate, about 3 to about 6%; moisture, about 1 to about 5%; and fat, about 0.2 to about 2%. A preferred product contains about 40.6% lactose, 18.0% protein, 25.6% ash, which are the three major components of the whey fraction. The product contains a relatively low calcium and phosphorus content of below 3%, i.e., about 0.4% and 2.2%, respectively.

It has now been found that the above modified whey product, which is available commercially as ENR-EX from Stauffer Chemical Company, Food Ingredients Division, Westport, Connecticut, when incorporated in a margarine in an effective amount to confer desired texture and syneresis characteristics on the product, e.g., at from about 0.5% to about 6% by weight of the margarine, preferably at about 2-4%, gives a final product having a smooth texture and a low level of syneresis. When used at the levels described above the modified whey solids product can be used as a total replacement for the nonfat dry milk solids, and preferably is so used in the margarine.

The following Examples illustrate some preferred embodiments of the invention:

EXAMPLE 1

The purpose of this example is to test the use of the whey solids according to the present invention with other types of whey solids and the conventional use of nonfat dry milk solids (hereinafter NFDM) in margarine.

A margarine formulation was made by first heating 400g of Crisco vegetable oil to about 54°C. (130°F.). To this heated oil was then added 10g of salt, 50g of water, 25g of non-fat dry milk solids (5.2% of the entire mixture) and 0.2 cc of carotene. The mixture was mixed in a C-100 Hobart mixer (small bowl and paddle type) for 5 minutes while being maintained at 43°C. (110°F.). The mixture was divided then placed in small aluminum cups and held at room temperature, 4.4°C. (40°F), and at −10°C. (14°F.), respectively, for three days.

The basic margarine formulation was:

| | |
|---|---|
| Vegetable oil ("Crisco" sold by Procter and Gamble) | 400 g |
| Salt | 10 g |
| NFDM | 25 g |
| Water | 50 cc |
| Carotene | 1 drop |

Samples of the above margarine containing 0.7, 3.1 and 5.1% by weight, respectively, of the whey solids product to be used in this invention, e.g., ENR-EX, sold by Stauffer Chemical Co., Food Ingredients Division, Westport, Connecticut, as well as three other types of whey and NFDM were prepared and were tested for flavor, fat separation, water separation, texture and color. The Table given below sets forth the results that were obtained.

TABLE 1

| Samples | (%) | Flavor[4] | Fat Separation[5] | Water Separation[6] | Texture | Color |
|---|---|---|---|---|---|---|
| ENR-EX[1] | 5.1 | slightly salty | none | 3 | smooth | slightly dark yellow |
| | 3.1 | acceptable | none | 2 | smooth | slightly dark yellow |
| | 0.7 | acceptable | slight fat specks | 4 | smooth | slightly dark yellow |
| NFDM | 5.1 | acceptable | moderately large fat specks | 2 | smooth | light yellow |
| | 3.1 | acceptable | none | 2 | smooth | light yellow |
| | 0.7 | acceptable | none | 2 | smooth | light yellow |
| DRIED Whey | 5.1 | acceptable | none | 4 | gritty | slightly dark yellow |
| | 3.1 | acceptable | none | 4 | slightly gritty | slightly dark yellow |
| | 0.7 | acceptable | none | 4 | smooth | light yellow |
| Modified Whey Product[2] | 5.1 | oily | no emulsification | 6 | lumpy | slightly orange |
| | 3.1 | oily | stratification | 6 | lumpy | with white |
| | 0.7 | oily | of product | 6 | slightly lumpy | undisolved granules |
| Modified Whey | 5.1 | oily | large fat specks | 5 | lumpy | slightly orange |
| | 3.1 | oily | slight fat specks | 5 | lumpy | with white |

TABLE 1-continued

| Samples | (%) | Flavor[4] | Fat Separation[5] | Water Separation[6] | Texture | Color |
|---|---|---|---|---|---|---|
| Product[3] | 0.7 | oily | none | 5 | slightly lumpy | undissolved granules |

[1] modified whey solids sold by Stauffer Chemical Co., Food Ingredients Division and containing 18.0% protein, 40.6% lactose, 25.6% ash, 2.2% moisture, 0.1% fat, 7.7% lactate, 4.5% citrate, having a pH of 7.3 (3% solution) and containing 289 calories/100 grams. It contains 0.3% calcium and 2.18% phosphorus.
[2] a modified whey solids product formed according to U.S. Patent No. 3,560,219 containing 15.8% protein, 36.5% lactose, 33.9% ash, 3.5% moisture, 1.3% fat, 4.0% lactate, 3.0% citrate, having a pH of 6.86 (3% solution) and 258 calories/100 gm. It contains 5.97% calcium and 6.85% phosphorus and is a partially soluble calcium-phospho-protein complex.
[3] First fraction from process in U.S. Reissue Patent No. 27,806 which contains 53.6% protein, 26.5% lactose, 10.2% ash, 3.0% moisture, 2.5% fat, 2.1% lactate, 2.4% citrate, has a pH of 7.0 (3% solution) and 343 calories/100 gm.
[4] Flavor enhancers normally used in margarine were not added in order to determine the true flavor of the product.
[5] Determined visually after aging the samples for three days at −12°C. (10°F.).
[6] The smaller the number, the lesser the amount of water observed on the surface of the product after standing at room temperature for 30 min.

The samples containing both NFDM and ENR-EX were all acceptable with the exception that the 5.1% NFDM product had some fat specks in it and the 0.7% ENR-EX containing product had some fat specks and a slightly increased level of water separation. The products containing the unmodified whey had unacceptable grittiness. The products containing the last two listed modified whey products were unacceptable.

EXAMPLE 2

The same margarine formulation that was made in Example 1 was again formulated.

The above procedure was then repeated to form products having no NFDM and having levels of ENR-EX and unmodified whey, respectively, equivalent in weight to the non-fat dry milk solids.

The following results were obtained:

| Sample | Flavor | Fat Separation[1] | Water Separation[2] | Texture | Color |
|---|---|---|---|---|---|
| with NFDM | acceptable | fat swirl | 8 | slightly stratified | yellow |
| without NFDM | acceptable | moderately large fat specks | 10 | very greasy | lighter yellow |
| with ENR-EX | acceptable | slight fat specks | 3 | smooth slightly | slightly darker yellow |
| with Whey | acceptable | moderately large fat specks | 2 | slightly gritty | slightly darker yellow |

[1] The fat separation was visually determined after aging for 3 days at 4.4°C. (40°F.).
[2] Water separation was determined by aging for 3 days at 4.4°C. and then warming to room temperature. The lower the number, the lesser the amount of water observed on the surface of the product.

The above Examples merely illustrate a preferred embodiment of the invention and should not be construed as limiting the scope of the invention. The appended claims set forth the scope of protection desired.

What is claimed is:

1. A margarine which comprises as an ingredient in its aqueous phase from about 0.5% to about 6%, by weight of the margarine, of the dried modified whey product which is formed by drying the second fraction which is obtained by passing partially delactosed cheese whey through the bed of a molecular sieve resin and which comprises a lactose content of from about 40% to about 50%, by weight, an ash content of from about 20% to about 30%, by weight, and a protein content to about 15% to about 20%, by weight.

2. A margarine as claimed in claim 1 wherein the modified whey product comprises about 2% to about 4% by weight of the margarine.

3. A product as claimed in claim 1 wherein the modified whey product further comprises from about 7% to about 11% by weight, lactate and from about 3% to about 6%, by weight, citrate.

4. A product as claimed in claim 2 wherein the modified whey product further comprises from about 7% to about 11%, by weight, lactate and from about 3% to about 6%, by weight, citrate.

5. A process for forming a margarine having a smooth texture and low syneresis which comprises incorporation in the aqueous phase of said margarine from about 0.5% to about 6%, by weight, of the margarine, of the modified whey solids product which is formed by drying the second fraction which is obtained by passing partially delactosed cheese whey through the bed of a molecular sieve resin and which comprises a lactose content of from about 40% to about 50%, by weight, an ash content of from about 20% to about 30%, by weight, and a protein content of from about 15% to about 20%, by weight.

6. A process as claimed in claim 5 wherein the modified whey product comprises about 2% to about 4% by weight of the margarine.

7. A process as claimed in claim 5 wherein the modified whey product further comprises from about 7% to about 11%, by weight, lactate and from about 3% to about 6%, by weight, citrate.

8. A process as claimed in claim 6 wherein the modified whey product further comprises from about 7 to about 11%, by weight, lactate and from about 3% to about 6%, by weight, citrate.

* * * * *

UNITED STATES PATENT AND TRADEMARK OFFICE
CERTIFICATE OF CORRECTION

PATENT NO. : 3,982,039

DATED : September 21, 1976

INVENTOR(S) : Gabriele E. Scibelli and Joseph V. Feminella

It is certified that error appears in the above-identified patent and that said Letters Patent are hereby corrected as shown below:

Table 1, under the heading "Color", line 12, "undisolved" should be -- undissolved --;

Table 1, Footnote 6, "standingat" should be -- standing at --;

Claim 1, line 10, "content to" should be -- content of --.

Signed and Sealed this

Twenty-ninth Day of March 1977

[SEAL]

Attest:

RUTH C. MASON
Attesting Officer

C. MARSHALL DANN
Commissioner of Patents and Trademarks